(12) United States Patent
Chan et al.

(10) Patent No.: US 6,948,002 B2
(45) Date of Patent: Sep. 20, 2005

(54) METHOD AND SYSTEM FOR A COMPUTER SYSTEM TO SUPPORT VARIOUS COMMUNICATION DEVICES

(75) Inventors: Victor Chan, Thornhill (CA); Kit Yin Madelaine Fok, Toronto (CA); Mark W. Hubbard, Maple (CA)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 10/010,887

(22) Filed: Dec. 7, 2001

(65) Prior Publication Data

US 2002/0156922 A1 Oct. 24, 2002

(30) Foreign Application Priority Data

Dec. 12, 2000 (CA) .............................................. 2328033

(51) Int. Cl.[7] .............................................. G06F 15/16
(52) U.S. Cl. .................................. 709/246; 715/762
(58) Field of Search ........................... 709/246; 715/762

(56) References Cited

U.S. PATENT DOCUMENTS

| 5,933,816 | A | | 8/1999 | Zeanah et al. ................ 705/35 |
| 5,963,727 | A | * | 10/1999 | Shih et al. ...................... 716/1 |
| 6,039,245 | A | | 3/2000 | Symonds et al. ........... 235/379 |
| 6,753,884 | B1 | * | 6/2004 | Finch et al. ................ 715/762 |

FOREIGN PATENT DOCUMENTS

| GB | 2350758 | 6/2000 | ........... H04L/12/18 |
| WO | 9843177 | 10/1998 | ........... G06F/13/38 |

OTHER PUBLICATIONS

Sixth Asia Pacific Software Engineering Conference (APSEC' 99) "Design of a Framework for Dynamic Content Adaptation to Web–Enabled Terminals and Enterprise Applications", by F. Kitayama, et al, Tokyo Research Laboratory, IBM Research.
DataX: an Approach to Ubiquitous Database Access, Hui Lei, et al, IBM Thomas J. Watson Research Center.
"Annotation–Based Web Content Transcoding", Masahiro Hori, et al, Computer Newtorks 33 (2000), 197–211.
"IBM WebSphere Transcoding Publisher V1.1", Juan R. Rodriguez, et al, Redbooks, pp. 1–39 and 93–129.
"Intermediaries: An Approach to Manipulating Information Streams", by R. Barrett, et al. pp. 629–641.

* cited by examiner

*Primary Examiner*—Mehmet B. Geckil
(74) *Attorney, Agent, or Firm*—A. Bruce Clay

(57) ABSTRACT

A system method of interfacing a computer system executing commercial transactions initiated from communication devices, each communication device having a display, with custom display parameters, is provided. For the system and method, at the computer system, for each device, a command is received and translated into a common format command. The common format command is executed and results therefrom are received. A database is accessed having elements identifying sets of display parameters, one set of the sets is for use with the custom display parameters. One set of display parameters is retrieved from the database.

31 Claims, 21 Drawing Sheets

FIG. 2

ADD TO CART

Description: Stove  202a
Manufacturer: Merchants  202b
Price: 500  202c

200

204
ADD TO CART    Reset

FIG. 4A

```
//
// Http Request Servlet
// public class RequestServlet extends HttpServlet {
    .
    .
    .

void service(HttpServletRequest request, HttpServletResponse response) throws
ServletException, IOException {
            // get an device format adapter that recognizes and handle this request
            // format from a Http Device Format Manager
            // the request can come from a browser or a mobile device or
            // any other source that conforms to the Http protocol 400         HttpAdapter adapter = HttpDeviceFormatManager.getAdapter(request,response);

// ask the adapter to convert the process the request
            // the adapter convert the request to a RequestObject recognized by the
            // web controller and invoke the processRequest() method on the web
            // controller 402         adapter.processRequest();
    }
    .
    .
    .
}
```

FIG. 4B(i)

```
//
// DeviceFormatAdapter
// - defines the basic interface that defines a device format adater
// interface DeviceFormatAdapter {

// returns a devicc format id
        getDeviceFormatId():
        // returns the device type
        getDeviceType();
        // returns a adapter specific session context
        getSessionContext();

}
//
// HttpAdapter
// - defines a Http specific device format adapter
// interface HttpAdapter extends DeviceFormatAdapter {
        // return a the HttpServletRequest
        getRequest();

// returns the input parameters
        getRequestProperties():

// process request
        processRequest();
}
```

// HttpAdapterBaseImpl
//
abstract class HttpAdapterBaseImpl implements HttpAdapter {

FIG. 4B(ii)

```
    HttpServletRequest req;
    HttpServletResponse res;
    HttpAdapterBaseImpl(HtipServletRequest req, HttpServletResponse res)
            // construct new instance of the adapter and initialize it with the request
            // and response
    } createRequestObject() ;
            // build a RequestObject based on the request information
    }
    processRequest() {
            // convert from HttpServletRequest into I RequestObject
            RequestObject reqobj = createRequestObject();

// pass request object and response object to web controller
            HttpWebController.processRequest(reqobj, res);
    } getRequest() {
            return req; )
    }
    TypedProperty getRequestProperties() {
            // extract request properties from request and put in in a TypedProperty
    }
}

//
// HttpBrowserAdapter
//
public class HttpBrowserAdapter extends HttpAdapterBaseImpl {
        .
        SessionContext getSessionContext() {
        // return an Http Browser specific session context
        }
}
//
// HttpPVCAdapter
//
public class HttpPVCAdapter extends HttpAdapterBaseImpl implement HttpAdapler }
        .
        SessionContext getSessionContext() {
        // return a PVC specific session context
        }
    }
```

FIG. 4C(i)

```
//
// RequestObject - defines the request object that is passed to the web controller
// from any network device
// each adapter can have add adapter specific extension to this
// for example. The Http Adapter adds the HttpServletRequest to this interface
//
interface RequestObject {                                              )
        // return the adapter used to format the incoming request      )
        getDeviceFormatAdapter();                                      )
        // returns the input properties for the command                )
        getRequestProperties();                                        )
        // returns the session context                                 )
        getSessionContext();                                           )    404
        // sets the adapter used to process this request               )
        setDeviceFormatAdapter();                                      )
        // set the input properties                                    )
        setRequestProperties();                                        )
        // sets the session context                                    )
        setSessionContext();                                           )
        // gets the command name                                       )
        get CommandName();                                             )
}
// CommandContext - defines the information that can be accessible to the
// command and the web controller to process a command
//
interface CommandContext() {
        .
        // returns the device type                                     )
        getDeviceType();                                               )
        // returns the input properties for the command                )
        getRequestProperties();                                        )
        // returns the store Id                                        )
        getStoreId();                                                  )
        // returns the user id                                         )    406
        getUserId();                                                   )
        // returns the command name                                    )
        setCommandName();                                              )
        setUserId();                                                   )
        // return the adapter used to format the incoming request      )
        getAdapter();                                                  )
        .
        .
}
```

FIG. 4C(ii)

```
// processRequest
// This is the main processing unit of the web controller
// It is responsible for the execution of a command within a transaction
//
processRequest(RequestObject req, ResponseObject res) {
        //create a command context object based on the input request
        CommandContext commandContext = createCommandContext(req,res);
        try {
                // beginTransaction();
                // set session data in command context
                retrieveSessionData(commandContext);

// look up and instantiate command to be executed
                ECCommand command = prepareRequest(commandContext);

// set input properties for command
                command.setRequestProperties(commandContext,
                getRequestProperties());

// set commandContext for command
                command.setCommandContext();

// execute command
                command.execute();

// update session data based on info from command context
                updateSessionData(commandContext);

// retrieve response properties from command
                responseProperties = command.getResponseProperties();

//get a response view
                command viewCommand = prepareResponse(responseProperties, commandContext);

// execute the view command
                        if (viewCommand != null) {
                                viewCommand.execute();
                        }
                commitTransaction()
        } catch (Exception e) {
                // rollbackTransaction();
                //
                handleError(e,commandContext);
                }
        }
}
```

FIG. 4C(iii)

```
// WebController is the abstract base class the handles any implementation that is
// common for all web controllers
// abstract class WebController {

CommandContext createCommandContext(RequestObj req, ResponseObject res)
        // save request object and response object in command context
        // also extract request parameters, request name, adapter type
    }
    ViewEntry getViewEntry(String commandName, CommandContext commandContext) {
        // look up view based on view name, storeId and device type
    }

UrlEntry getUrlEntry(String commandName, CommandContext commandContext) {
        // look up url entry based on command name and storeId ECCommand instantiateCommand(ViewEntry viewEntry, CommandContext      410
            commandContext)
        // instantiate command based on interface for view command, store id
    }
    ECCommand instantiateCommand(UrlEntry urlEntry, CommandContext        410
            commandContext) {
        // instantiate command based on command interface, store id
    }
```

FIG. 4C(iv)

```
//
// HttpWebController handles any implementation that is specific to the Http protocol
//
public static class HttpWebController {
        ECCommand prepareRequest(CommandContext) throws Exception {
        // look up url entry from URLREG based on name and store id UrlEntry urlEntry =getUrlEntry(commandContext.getCommandName(),commandContext);

if (urlEntry == null) {
                // look up view based on view name, storeid and device type
                ViewEntry viewEntry =
                getViewEntry(commandContext.getCommandName(),commandContext);
                command = instantiateCommand(viewEntry,commandContext);

} else {
                // check for https redirection
                if (urlEntry.isHttps() && (!commandContext.isHttps()) {

ViewEntry viewEntry = getViewEntry("HttpsRedirectView", commandContext);

// instantiate command based on interface for view command, store id
                command = instantiateCommand(viewEntry,commandContext);

} else {
                // instantiate command based on command interface, store id
                command = instantiateCommand(urlEntry,commandContext);
        }
}
return command;
//
// prepareResponse
//
        ECCommand prepareResponse(TypedProperty responseProperties,
CommandContext
        commandContext)throws Exception {
        // return view command;
    }
    retrieveSessionData(CommandContext commandContext) {
        // retrieve session data from session context and set it in command context
    }
    updateSessionData(CommandContext commandContext) {
        // retrieve session data from command context and set it in session context
    }
}
```

FIG. 4C(v)

```
//
// TypedProperty - an extended Hashtable that is used passed request and
// response information to and from a command
//
class TypedProperty extends Hashtable {

.
    .
    String getString(String parameterName) {
        // return the values of a parameter as a String
    }
    String getInteger(String parameterName) {
        // returns the value of a parameter as an Integer
    }
    String[] getStringArray(String parameterName) {
        // return the values of a parameter as an array of String
    }
    putParameter(String parameterName, Object parameterValue) {
        // store the parameterValue against a parameterName
    }
    .
    .
}
```

FIG. 6A

```
//
//The MQ Adapter listens for incoming messages from the network
//
public class MQSerialAdapter {

.
        //
        serviceLoop() {
                while (true) {
                        // get a message from the queue
                        MQMessage msg = getRequestFromQueue();

// create an adapter to transform and process this message
                        XmlAdapter adapter = createAdapter(MQMessage msg);
                        adapter.processRequest();
                }
        }
        .
        .
} public class XmlAdapter implements DeviceFormatAdapter { processRequest() {
                // convert from message from xml format into a
                // RequestObject
                RequestObject reqobj = createRequestObject(job);
                //
                XMLWebController.processRequest(reqobj, job);
        }
}
```

FIG. 6B

```
//
// XMLWebController handles any implementation that is specific to the MQAdapter
// public class XMLWebController extends WebController {
        ECCommand prepareRequest(CommandContext commandContext)
        throws Exception {

// look up url entry from URLREG based on command name and storeId
                UrlEntry urlEntry = getUrlEntry(getCommandName(),commandContext);

// instantiate command based on command interface, store id
                command = instantiateCommand(urlEntry,commandContext);

//
                return command;
        }

ECCommand prepareResponse() throws Exception {
                // MQ don't need any response view
                return null;
        } retrieveSessionData(CommandContext commandContext) {
                // noop - MQ don't have session info
        } updateSessionData(CommandContext commandContext) {
                // noop - MQ don't have session info
        }
}
```

FIG. 7A

```
//
// Scheduler
// The scheduler runs background jobs. They can be jobs that is to be executed only
// once at a specified time or can be jobs that are to be run at regular intervals.
// Jobs are added to the database with the request information, a preferred start time,
// user id and or frequency intervals.
// Job can be added from the browser or from another command
// public class Scheduler {
    //
    serviceLoop() {
        while (true) {
            // sleep time is determined by the start time of next job
            sleepUntilNextJobIsToBeRun();

// retrieve the job that need to be executed now from the
            // database
            SchedulerJob job = getReadyToRunJob();

// allocate a thread to run the job
            SchedulerThread thread = getThreadToRunJob(job);

// start the thread
            thread.start();
        }
    }
}
```

FIG. 7B

```
//
// SchedulerThread
//
public class SchedulerThread {
        SchedulerJob job;
        run() {
            service(job);
        }
        service(SchedulerJob job) {
            // create a scheduler adapter to process the job
            SchedulerAdapter adapter = createSchedulerAdapter(job);
            adapter.processRequest();
        }
}
//
// SchedulerAdapter
// The scheduler adapter is responsible for converting a scheduler job into a request object
// and pass on to the SchedulerWebController
//
public class Scheduler Adapter implements DeviceFormatAdapter {
    processRequest ()
            // convert from scheduler job info into a RequestObject
            RequestObject reqobj = createRequestObject(job);

// pass request to SchedulerWebController to process
            SchedulerWebController.processRequest(reqobj, job);
    }
}
```

FIG. 7C

```
//
// SchedulerWebController handles any implementation that is specific to the scheduler
// public static class SchedulerWebController extends WebController {
    ECCommand prepareRequest(CommandContext commandContext)
    throws Exception {

// look up url entry from URLREG based on command name and storeId
        UrlEntry urlEntry =
        getUrlEntry(getCommandName(),commandContext);

// instantiate command based on command interface, store id
        command = instantiateCommand(urlEntry,commandContext);

//
        updateDatabase(" jobStarted");

return command;
    }
    ECCommand prepareResponse() throws Exception {

// update scheduler database
        updateDatabase(" jobCompleted");
        // a background job do not return a view
        return null;
    } retrieveSessionData(CommandContext commandContext) {
        // noop - scheduler don't have session info
    }
    updateSessionData(CommandContext commandContext) {
        // noop - scheduler don't have session info
    }
}
```

FIG. 8

| | | |
|---|---|---|
| Id | Stove | ⎫ Initial build |
| Item | 456 | ⎭ by Adapter |
| Results | XX | ⎫ |
| Okay | YYY | ⎪ |
| -- | -- | ⎬ Added by Response from Controller Command |
| -- | -- | ⎪ |
| -- | -- | ⎪ |
| -- | -- | ⎭ |

| | ViewName | StoreId | DeviceType | Infertace Name | Class Name | Properties |
|---|---|---|---|---|---|---|
| 1 | A | 0 | Browser | HttpForward ViewCmd | HttpForward ViewCmd Impl | docname= a.jsp |
| 2 | A | 1 | Browser | HttpForward ViewCmd | HttpForward ViewCmd Impl | docname= a1.jsp |
| 3 | A | 2 | Browser | HttpForward ViewCmd | HttpForward ViewCmd Impl | docname= a2.jsp |
| 4 | A | 3 | Browser | HttpForward ViewCmd | HttpForward ViewCmd Impl | docname= a1.jsp |
| 5 | A | 0 | PVCDevice | HttpForward ViewCmd | PVCForward ViewCmd Impl | docname= a.jsp |
| 6 | A | 1 | PVCDevice | HttpForward ViewCmd | PVCForward ViewCmd Impl | docname= a1.jsp |
| 7 | A | 2 | PVCDevice | HttpForward ViewCmd | PVCForward ViewCmd Impl | docname= a2.jsp |

METHOD AND SYSTEM FOR A COMPUTER SYSTEM TO SUPPORT VARIOUS COMMUNICATION DEVICES

FIELD OF INVENTION

This invention relates generally to a method and system for a computer system in a communication network, and in particular, a system and method for a computer system in a communication network to support heterogeneous communication devices.

BACKGROUND OF THE INVENTION

The existence of high-speed personal Internet connections and the use of the World Wide Web for commerce, entertainment and education provide significant benefits to users of the Internet. The wide-spread, low-cost and continuous availability of web-based information services has spawned changes ranging from new business models to facilitating access to government and education services, to the rapid and free exchange of ideas and information for all members of the Internet community.

Traditionally, devices communicating with the World Wide Web were computers. The computers operated "browser" software thereon to communicate with remote computers and servers connected to the World Wide Web. However, recently, a new class of devices is being developed to perform transactions with these web-based information services. In particular, personal digital assistants, mobile phones, office PCs and home entertainment systems provide pervasive computing systems allowing access to the services on the World Wide Web.

Pervasive computing provides access to relevant information stored on powerful networks, allowing them to easily take action anywhere, anytime. These new intelligent appliances or "smart devices" are embedded with microprocessors that allow users to plug into intelligent networks and gain direct, simple, and secure access to both relevant information and services. These devices may be as simple to use as calculators, telephones or kitchen toasters. They are also known as pervasive computing devices. Pervasive computing simplifies life by combining open standards-based applications with everyday activities.

However, there are issues with interfacing these pervasive computing devices with services provided through the Internet. For example, an e-commerce application operating through the Internet must properly communicate with each device in accordance with the device's protocols for communications, display, interfacing and other parameters.

Technologies, such as servlets, Enterprise Java Beans (EJBs) and Java Server Pages (JSPs), enable modular development of software for e-commerce applications to consider these issues. However, e-commerce applications utilizing these technologies should still consider issues such as:

1. Providing common server components that can process requests from various Internet clients or internal processes, such as a web browser operating on a personal computer, a web-enabled mobile phone or an internal job scheduler;
2. Separating business logic from views, so that business logic may be reused in other applications;
3. Establishing transaction and access limits to maintain data integrity and maximum transaction throughput;
4. Providing common interface to the clients but allowing different implementations of the business logic based on the need of an individual store in an electronic mall; and
5. Providing a system and method for distributed commercial transaction processing.

Accordingly, there is a need to provide an e-commerce system, wherein a common platform is provided which can accommodate various display interface and reporting requirements for various devices accessing the system.

SUMMARY OF THE INVENTION

In a first aspect, a method of interfacing a computer system executing commercial transactions initiated from communication devices, each device having a display with custom display parameters is provided. For one device, the method receives a command from the device, translates the command into a common format command, the common format command being executable by the computer system, executes the common format command, receives results from execution of the common format command, accesses a database containing elements identifying sets of display parameters, one set for use with the custom display parameters and retrieves from the database the set of display parameters.

The method may extract command parameters from the command into an object after receiving the command and initiate displaying of the results using the set of display parameters on the device after retrieving the set of display parameters from the database.

The method may translate the command into the common format command by accessing a first table having a first record, the first record having a first entry for the command and a second table having a second record correlated to the first record for the common format command.

The method may incorporate the results of the execution of the common format command into the object after receiving the results.

The method may incorporate the set of display parameters into the object after retrieving the display parameters from the database. Further, the method may incorporate into the object a view command identifying a composition of a view associated with the command after retrieving the set of display parameters from the database. Further the method may select a view command from a forward view, a redirected view or a direct view.

The method may be embodied in an object oriented programming language.

In a second aspect an article comprising a computer readable medium and a program encoded on the medium is provided. The program is for use in a computer system executing commercial transactions initiated from communication devices, each device having a display with custom display parameters. The program embodies a method comprising the following steps for one device: receiving a command from the device, translating the command into a common format command, the common format command being executable by the computer system, executing the common format command, receiving results from execution of the common format command, accessing a database having elements identifying sets of display parameters, one set for use with the custom display parameters and retrieving from the database the set of display parameters.

The article may have the method of the program further comprising the steps of extracting command parameters from the command into an object after receiving the command and initiating displaying of the results using the set of display parameters on the device after retrieving the set of display parameters from the database.

The article may have the method of the program further accessing a first table having a first record, the first record having a first entry for the command and a second table having a second record correlated to the first record for the common format command.

The article may have the method of the program further comprising the steps of incorporating the results into the object after receiving the results from execution of the common format command.

The article may have the method of the program further comprising incorporating the set of display parameters into the object after retrieving from the database the set of display parameters.

The article may have the method of the program further comprising incorporating a view command identifying a composition of a view associated with the command into the object after retrieving from the database the set of display parameters.

The article may have the method of the program further comprising producing an output report relating the results to the device.

In a third aspect, a system for executing commercial transactions initiated from communication devices is provided. Each communication device has a display with custom display parameters. The system comprises a computer, a communication link for the computer to the communication devices and a program operating on the computer. The program embodies a method comprising, for one device, receiving a command from the device, translating the command into a common format command, the common format command being executable by the computer system, executing the common format command, receiving results from execution of the common format command, accessing a database comprising elements identifying sets of display parameters, one set associated with the custom display parameters, and retrieving from the database the set of display parameters.

The system may have the method of the program further comprising extracting command parameters from the command into an object after receiving the command and initiating displaying of the results using the set of display parameters on the device after retrieving the set of display parameters from the data from the database.

The system may have the method of the program further accessing a first table having a first record, the first record having a first entry for the command and a second table having a second record correlated to the first record for the common format command.

The system may have the method of the program further comprising incorporating the results into the object after receiving the results from execution of the common format command.

The system may have the method of the program farther comprising incorporating the set of display parameters into the object after retrieving it from the database.

The system may have the method of the program further comprising incorporating a view command identifying a composition of a view associated with the command into the object after retrieving from the database the set of display parameters.

The system may have the method of the program further comprising producing an output report relating the results on the device.

In a fourth aspect, an article is provided. The article comprises a computer readable modulated carrier signal and a program encoded in the computer readable modulated carrier signal. The program is for use in a computer system executing commercial transactions initiated from communication devices, each device having a display with custom display parameters. The program embodies a method comprising, for one device, receiving a command from the device, translating the command into a common format command, the common format command being executable by the computer system, executing the common format command, receiving results from execution of the common format command, accessing a database comprising elements identifying sets of display parameters, one set for use with the custom display parameters and retrieving from the database the set of display parameters.

The article may have the method comprising extracting command parameters from the command into an object after receiving the command and initiating displaying of the results using the set of display parameters on the device after retrieving the set of display parameters from the database.

The system may have the method of the program further accessing a first table having a first record, the first record having a first entry for the command and a second table having a second record correlated to the first record for the common format command.

The system may have the method of the program further comprising incorporating the results into the object after receiving the results from execution of the common format command.

The system may have the method of the program further comprising incorporating the set of display parameters into the object after retrieving from the database the set of display parameters.

The system may have the method of the program further comprising incorporating a view command identifying a composition of a view associated with the command into the object after retrieving from the database the set of display parameters.

The system may have the method of the program further comprising producing an output report relating the results on the device.

Other aspects of the invention provide various combinations and subsets of the aspects described above.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 2 is a representative screen shot of a browser page utilized by a device accessing the server of FIG. 1;

FIG. 4A is a pseudo-code listing of a Request Servlet for the software associated with the server of FIG. 1;

FIG. 4B(i)–(ii) collectively are listings of Adapter modules associated with the request servlet of FIG. 4A;

FIGS. 4C(i)–(v) collectively are a pseudo-code listing of a controller for software associated with the server of FIG. 1;

FIG. 6A is a pseudo-code listing of an MQ adapter for the software associated with the server of FIG. 1;

FIG. 6B is a pseudo-code listing of an XML controller for the software associated with the MQ adapter of FIG. 5A;

FIG. 7A is a pseudo-code listing of a scheduler for the software associated with the server of FIG. 1;

FIG. 7B are pseudo-code listings of a schedule thread and a scheduler adapter associated with the server of FIG. 1;

FIG. 7C is a pseudo-code listing of a scheduler web controller for the software associated with the server of FIG. 1;

FIG. 8 is a block diagram of a hash table used by the software of the embodiment shown in FIG. 1; and FIG. 9 is block diagram of an exemplary view table for the embodiment of the software of FIG. 1.

DETAILED DESCRIPTION OF THE EMBODIMENTS

Figure 1:
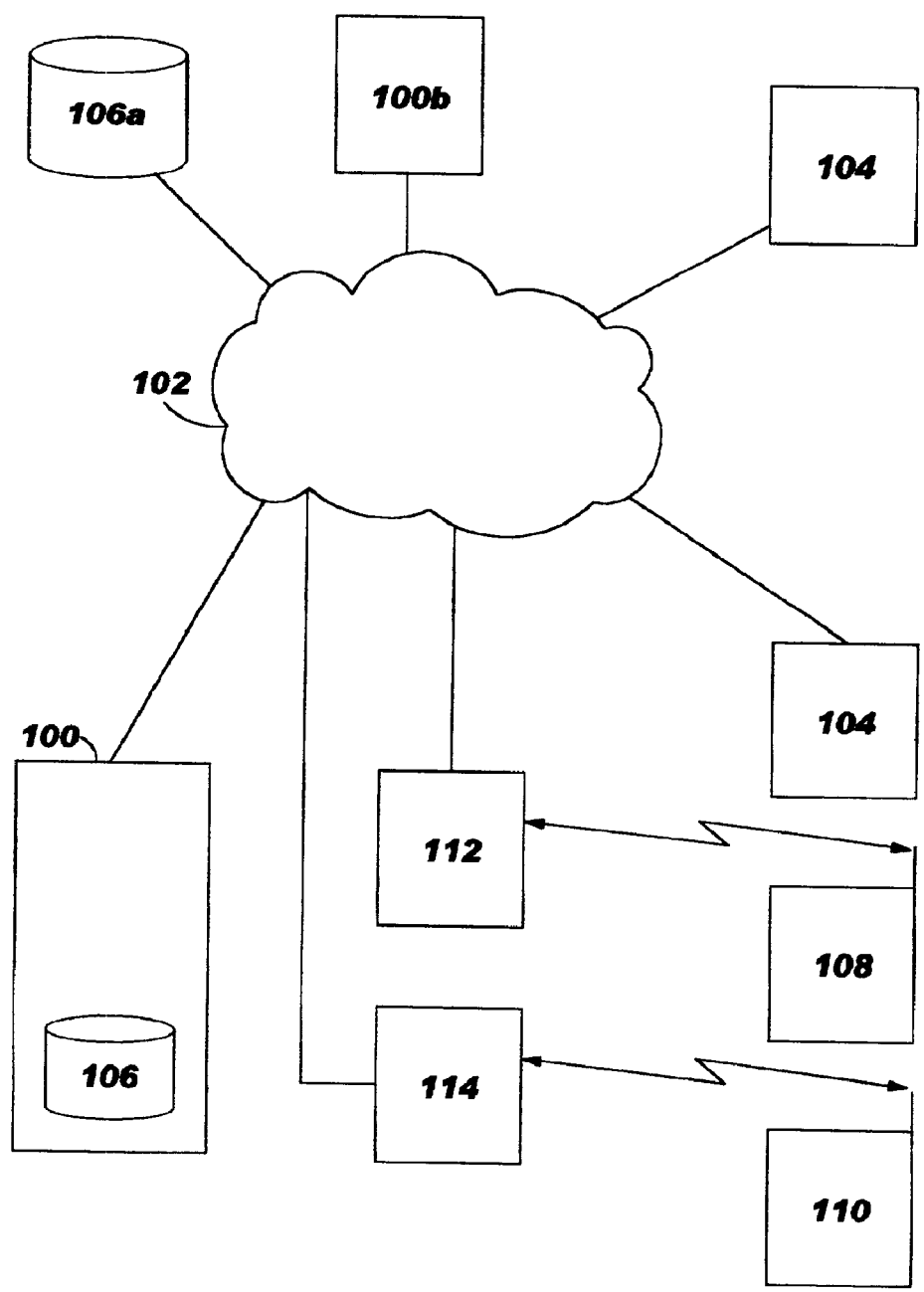
FIG. 1 is a block diagram of a communication network including an e-commerce server comprising an embodiment of the invention.

The description which follows, and the embodiments described therein, are provided by way of illustrating an example, or examples, of particular embodiments of principles of the present invention. These examples are provided for the purpose of explanation, and not limitation, of those principles and of the invention. In the description which follows, like elements are marked throughout the specification and the drawings with the same respective reference numerals.

Figure 1A:
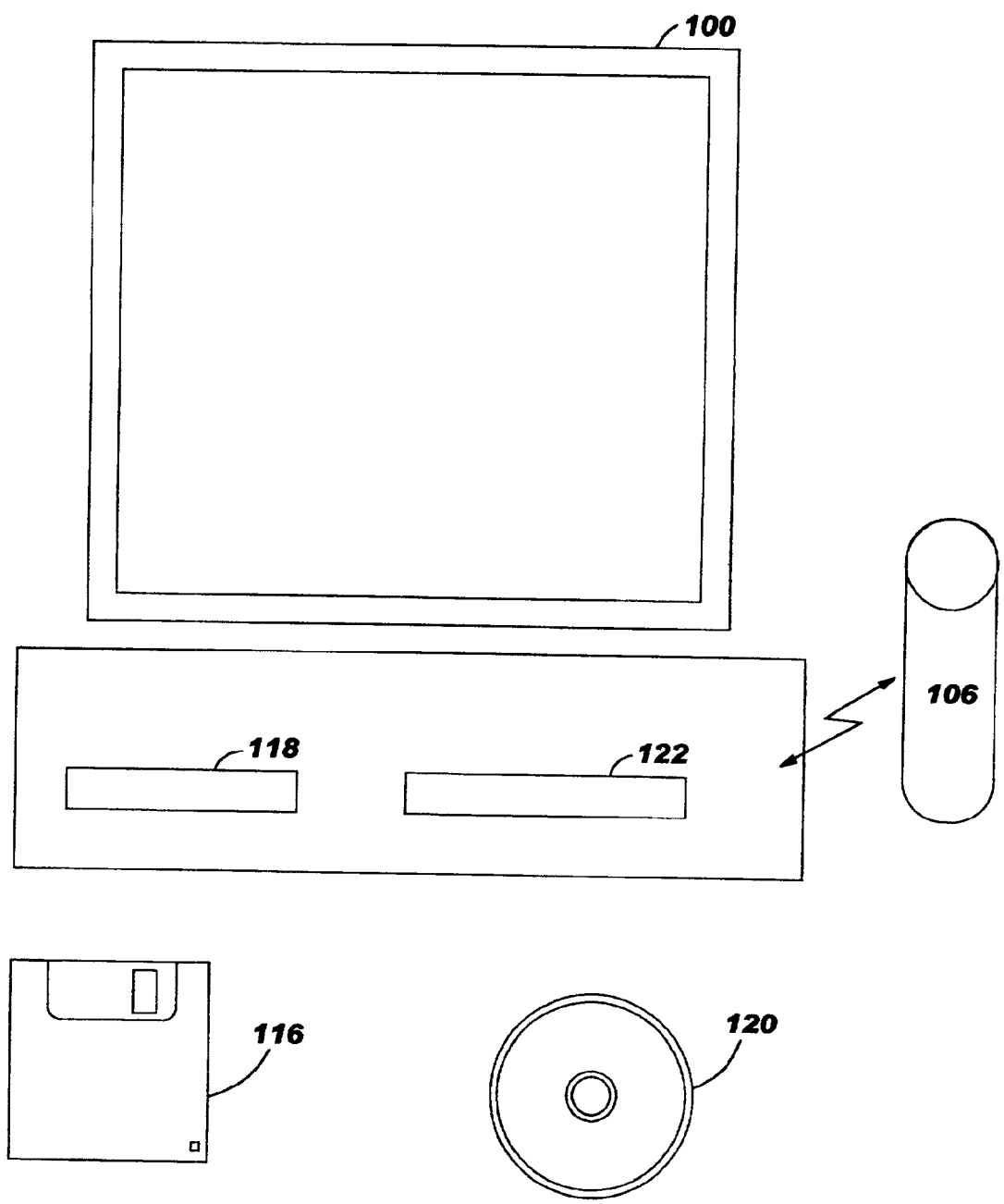
FIG. 1A is a block diagram the e-commerce server of the embodiment of FIG. 1.

Referring to FIGS. 1 and 1A, e-commerce server 100 is shown connected to network 102. Web browser on computer 104 is connected to network 102 and communicates through network 102 to server 100. Cell phone 108 and pager 110 also communicate with server 100. Intermediary gateways 112 and 114, respectively, provide required hardware and software interfaces for cell phone 108 and pager 110 to communicate with network 102 and, hence, to server 100. Other computers 100b may have software providing business-to-business applications with server 100. Communication network 102 may be the Internet.

Server 100 is a typical computer having a microprocessor and memory for storing and executing software. Software may be loaded into server 100 via a floppy disk 116 through a disk drive 118, CD-ROM 120 through a CD-ROM drive 122 or via downloaded software through a network connection to network 102 from another computer 100c. It will be appreciated that other media devices and mechanisms may be used to load software on to server 100 such as a remote download through the network connection. The software may be encoded on an appropriate carrier signal received through the connection.

Server 100 provides clients operating web browser 104, web-enabled cellular communication device 108, pager 110 or similar web-enabled devices with access to software operating thereon. The software provides processing of commercial transactions, including ordering products and querying aspects of products (e.g. price, size, availability). Information regarding products catalogued by the software is stored on database 106. Database 106 is also associated with software on server 100. It can be appreciated that database 106 may be located within server 100 or may be associated with server 100 in a distributed manner through network 102, such as with database 106a.

From web-browser 104, remote resources located on server 100 may be accessed through network 102 using an appropriate Uniform Resource Locator, (URL), which is a pointer to a "resource" on the World Wide Web. A resource may be a file or a directory, or it may be a reference to a more complicated object, such as a query to a database or to a search engine.

In general, a URL can be broken into several parts. The exemplary URL "http://www.ncsa.uiuc.edu/demoweb/url-primer.html" indicates that the protocol to use is http (Hyper Text Transfer Protocol) and that the information resides on a host machine named www.ncsa.uiuc.edu. The information on that host machine is named /demoweb/url-primer.html. The exact meaning of this name on the host machine is both protocol dependent and host dependent. The information normally resides in a file, but it maybe generated dynamically. This component of the URL is called the path component.

Referring to FIG. 2, screen shot 200 shows a typical transaction screen shown on web browser 104 when accessing software on server 100. Transaction screen 200 has fields 202 into which a user enters or selects values to compose a transaction, which will be executed on server 100. Consider an example where a user of browser 104 is in a web site of an electronic shopping mall having several merchants. The user can select various items from various merchants. The user now wishes to add a "stove" selected from "Merchants" having a price of "$500". This transaction is to be added to the user's "shopping cart". Through web browser 104, the user enters or selects the values for the fields, e.g. "stove" in field 202a, "Merchants" in field 202b, then selects a price from field 202c, e.g. $500. The user then activates the "Add to Cart" button 204, which causes the software on server 100 to generate an appropriate command to add an item for "stoves" from "Merchants" which cost "$500" to the shopping cart of the user. For the above example, web browser 104 may cause the generation of a URL such as "http:\\compute\name\addtoshopcart?catalogid=stove&catalogitem=1234&price=500" which embodies the request. The software on server 100 executes the request in the URL and reports the results to web browser 104 in an appropriate format. It will be appreciated that a similar transaction may be initiated to server 100 through a cell phone 108 or pager 110. Accordingly, the display format for cell phone 108 and pager 110 may differ from the display format of web-browser 104, due to the differing physical size and capabilities of each display for each device 104, 108 or 110. The embodiment enables server 100 to provide various display formats for differing devices 104, 108 and 110, while isolating the data processing aspects of the software on server 100 from its display processing for each device 104, 108 and 110.

Figure 3:
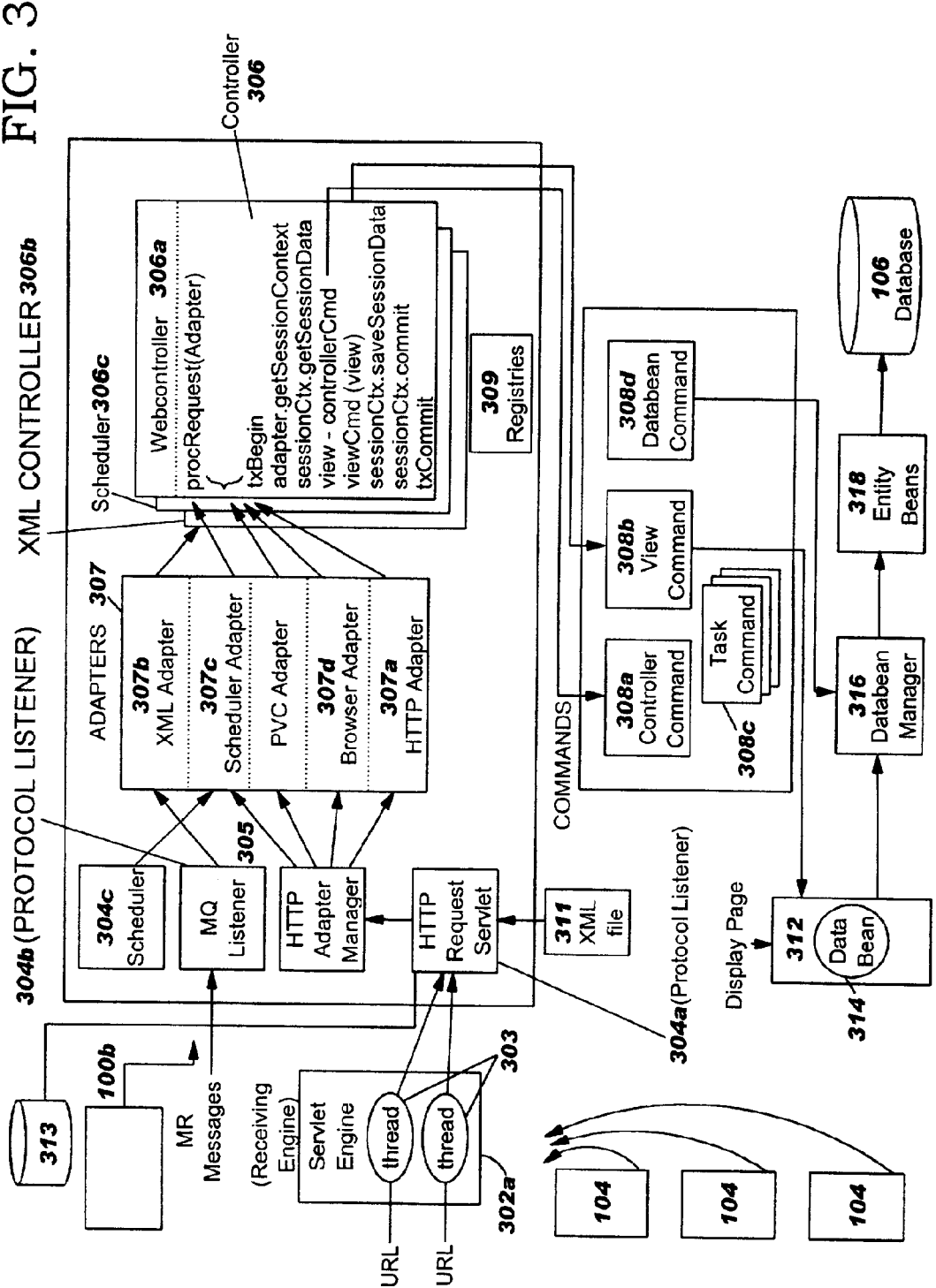
FIG. 3 is a block diagram of software modules operating on the server of FIG. 1.

Referring to FIG. 3, elements of software operating on server 100 are shown. At a basic level, first, browser 104 generates a URL containing a request. The request is received by server 100 at a receiving engine 302. In the preferred embodiment, separate servlet engines 302a is provided for a URL request. The servlet engine 302a analyses the request and allocates a thread 303 to the request. Threads and their processing, are known in the art.

Next, a protocol listener 304 "listens" for a request originating from a receiving engine 302. In the preferred embodiment, request servlet engine 304a is the protocol listener for URL requests.

Protocol listener 304 passes the information in the URL to an appropriate adapter 307. There are several adapters in server 100. Each adapter formats data into an appropriate format for each the of device. For example, in the embodiment adapters 307 include: HTTP adapter 307a, XML adapter 307b, and scheduler adapter 307c. Specific types of HTTP adapters 307 include browser adapter 307d and PVC adapter 307c. Note however, that in the preferred embodiment, an adapter manager 305 is provided to select the appropriate adapter 307. Once the particular adapter 307 is identified, adapter manager 305 passes the request to the adapter.

The task of the adapter 307 is to create an object as the common element manipulated by the software on server 100. Use of an object enables functional commands associated with the request to be isolated from interface issues with the requesting devices and enables new display types for new devices to be implemented without affecting the implementation of the command logic for the software. Adapter 307 populates the object with information from the URL request and passes the object to the web controller 306a. A response object is also generated, which, in the embodiment, is the same as the response object received by the request servlet engine.

Web controller 306a receives the request object and the response object and creates a command context for the request. The command context provides execution parameters for controller commands and view commands (described later) and contains request object information and session information. Session information includes language, store, user identification and other information associated with the session in which the user currently resides.

To instantiate the correct command to process one request, web controller 306a accesses data in command registries 309 to identify the command to execute corresponding to the request. Three tables are accessed. First, Table A (described later) contains a URL registry which contains an interface name related to a command registry. A command registry table (Table B, described later) has a corresponding interface name which contains the name of the class to instantiate. The web controller then instantiate the command which uses the command context. Table C, described later, contains information relating to display parameters which will be used when reporting the results of the request to the input device.

Next, web controller 306a passes the request properties and the command context to the controller command. The web controller then calls for the execution of the controller command and the controller command executes. In execution, the controller command builds response properties into a response properties object. The response properties object includes a hash table which includes a view name.

Next, web controller 306a retrieves the response properties from the controller command. Web controller 306a then instantiates a view command based on one view name specified in the response properties and the input device identified in the command context and executes the view command. Execution of the view command causes the results of the controller command to be displayed on the calling browser 104 in a display format which is compatible with the calling browser 104.

Server 100 also provides access to computer systems employing MQ (Message Queue) communication protocols. Accordingly, computer 100b provides MQ messages to MQ listener 302b of server 100. In the preferred embodiment, MQ requests are processed in XML format. Accordingly, MQ listener 302b provides requests sent to it to XML adapter 307b.

Server 100 also provides a scheduler which allows requests to be scheduled to be initiated at certain times or certain intervals. The scheduler comprises scheduler adapter 307c and scheduler controller 306c. There is no protocol listener 302 associated with the scheduler. Instead, the scheduler consists of a program that "wakes up" at regular intervals. Schedulable requests are entered into the scheduler database 313 from request servlet 302a or MQ listener 302b. At times associated with the scheduled requests, scheduler 306c initiates the processing of the request.

Figure 3A:
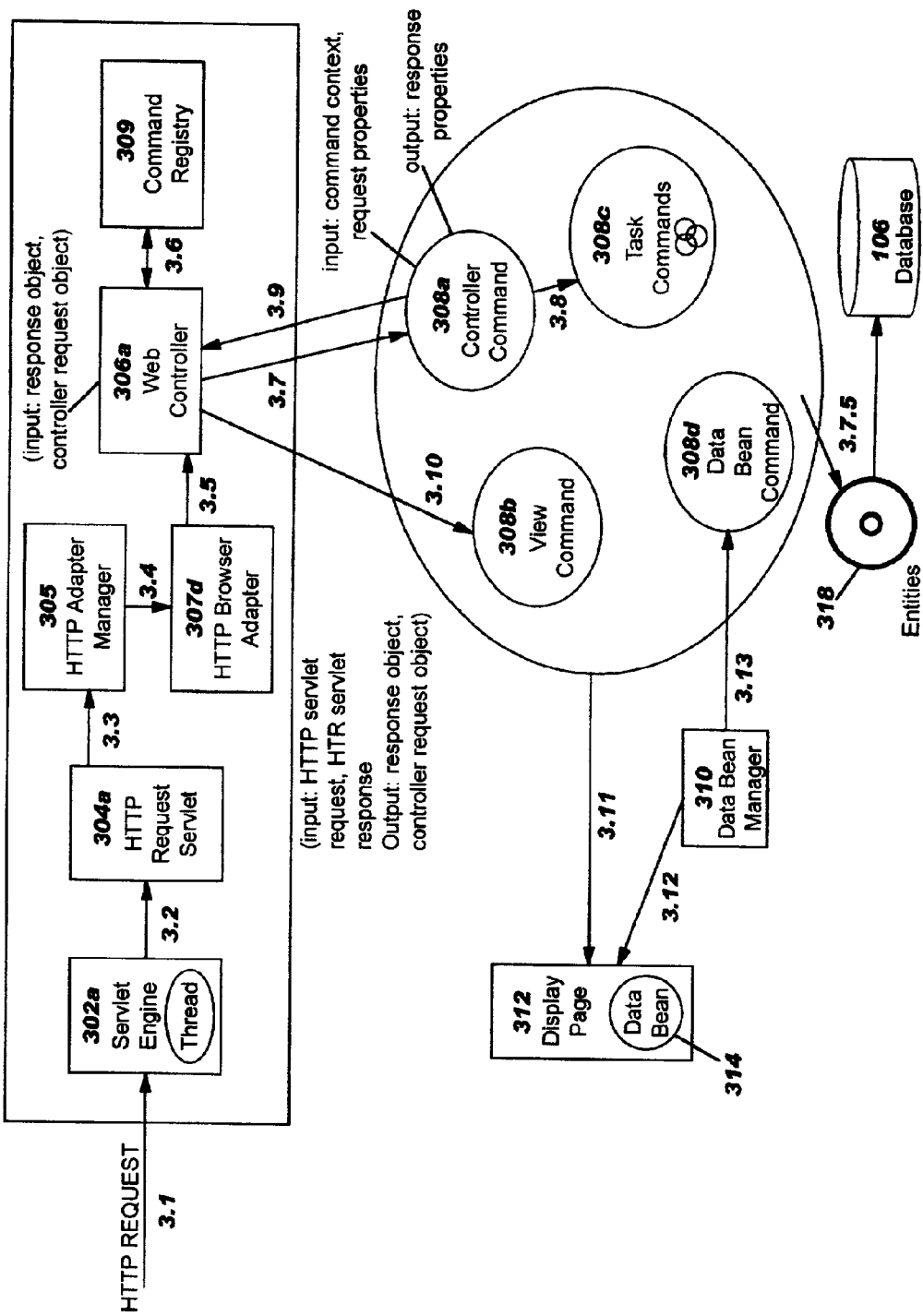
FIG. 3A is a block diagram of the software modules shown in FIG. 3 during execution of a transaction.

Referring to FIGS. 3 and 3a, an example of the process flow through server 100 for an HTTP request is provided.
Step 3.1
HTTP request from browser 104 is generated and directed to servlet engine 302a.
Step 3.2
Servlet engine 302a allocates a thread 303a for the request. Servlet engine 302a dispatches the request to request servlet 304a.
Step 3.3
Request servlet 304a "listens" for the request and passes the request to HTTP adapter manager 305. Referring to psuedo-code in FIG. 4A at line 400, HTTP adapter manager 305 identifies which adapter 307 is to be used. At line 402 adapter 307 is called to convert the request to a format recognized by controller 306.

FIGS. 4B(i) and 48(ii) provide a definition for a device format adapter and WTPAdapter which defines an HTTP device specific adapter. Referring to FIG. 4B(ii), HTTP-AdapterImpl provides the pseudo-code for a base implementation for an HTTP adapter. Further, pseudo-code for HTTPBrowser provides one implementation for HTTP-Adapter for a browser and pseudo-code for HTTPPVC-Adapter provides one implementation for a PVC adapter.
Step 3.4
Referring to FIGS. 3 and 3a, adapter manager 305 determines that the request originated from an Internet browser; accordingly, for this example, the request is passed to browser adapter 307d.
Step 3.5
Browser adapter 307d creates a request object and a response object from the request information. In FIG. 4C(i), the object definition for a RequestObject (at 404) is provided.

Next, browser adapter 307d populates the objects with information from the request. Transformation of request information to data for the objects is based on the mapping defined in an XML mapping table 311. Table 311 is initialized during server 100 initialization. URL parameter names are mapped to command attribute names as defined in the XML mapping table 311 and form an input properties object. For example, a URL parameter such as "merchant_rn" may be mapped to "merchantReferenceNumber" for the server command.

Next, browser adapter 307d passes the request object and the response object to web controller 306a.

Referring to FIGS. 4C(ii)–4C(iv), pseudo-code for web controller 306a is provided. Web controller 306a performs the following tasks in processing a request object:

1. Executing functions related to a HTTP session for device 104; this includes establishing a correct user object and creating a command context object based on the current HTTP session. Further detail on the command context is provided later;
2. Determining whether a secure HTTP (HTTPS) is enforced for the current URL. If it is enforced and the current HTTP request is not HTTPS, then the browser is redirected to a HTTPS URL. See FIG. 4C(iv) "prepareRequest" pseudo-code;
3. Initiating a transaction using Java Transaction API;
4. Instantiating a controller command 308a or a view command 308b and passing the command context and input property objects to the command 308. FIG. 4C(iii) at lines 410 shows the pseudo-code for the instantiation of the controller command 308a and view command 308b;
5. Re-attempting the controller command on a Transaction Rollback exception if the controller command can be retried;
6. Fetching a response view command based on the view name and the device type. A controller command normally returns a view name when there is a response to be sent back to the client. The response is displayed at the client through a view command 308b. Three types of view commands 308b are described later. If there is no view name returned by the controller command, web controller 306a will send back a HTTP response with no data; and
7. Rolling back or committing the current transaction. A transaction must be rolled back if the command cannot be completed.

Step 3.6

Referring to FIG. 4C(i), web controller creates a command context related to the request received from the Browser adapter 307d. The structure of the command context is shown at 406.

Web controller 306a populates the command context using parameters from the request object and the response object. The parameters include the name of the store ("Merchants") and the item requested ("stove"). The command context is also provided the session information, e.g. the source of the web session, the language, the time zone and information identifying the device type. The command context may also be provided with a user profile associated with the command, any cookies or session information associated with the command context.

To instantiate the correct command associated with the request, web controller 306a queries the command registry 309. Referring to FIGS. 3 and 3A, command registry 309 comprises a series of tables containing information regarding specific command types and views for devices accessing server 100.

First, web controller 306a looks up the corresponding command from the URLREG Table A in command registry 309. Table A provides a series of columns containing information for interfaces for web controller 306a. These interfaces are abstracted from other aspects of the software operating on server 100 and accordingly, are independent of input and output parameter formats.

TABLE A

URLREG

| Column Name | Column Description |
|---|---|
| URL | URL name |
| STORE_ID | Store identifier |
| DESCRIPTION | Description of this URL |
| HTTPS | Secure HTTP required for this URL request |
| AUTHENTICATION | User sign-in is required for this URL request |
| INTERFACENAME | Controller Command Interface Name |

For each URL, a store can register different HTTP and AUTHENTICATION attributes for the URL. Web controller 306a fetches the interface name of a controller command for an incoming URL request, and uses it to look up the implementation class name from the CMDREG shown in Table B. Web controller 306a also determines whether HTTPS is required for the URL request by evaluating the contents of the HTTPS field in Table A.

Next, web controller 306a accesses a command registry table (Table B) in command registries 309. Using the contents of the INTERFACENAME field in Table A and correlating that entry to the INTERFACENAME field in Table B, a name of a class corresponding to the command of the request is provided.

TABLE B

CMDREG

| Name | Description |
|---|---|
| INTERFACENAME | Command Interface Name |
| STORE_ID | Store ID for this command |
| DESCRIPTION | Description of this command |
| CLASSNAME | Conmand Implementation class name |
| PROPERTIES | Default name value pares as input properties to the command |
| LASTUPDATE | Last update on this Command Entry |
| TARGET | Command target name. Set to null for non targettable command. |

Note that the command implementation class can differ amongst merchants. Controller command 308a is a targetable command that directly interacts with a web controller 306a. A targetable command can be executed on a different target container. In the preferred embodiment local targets are supported. It will be appreciated that an implementation for EJB Session Bean as a targetable container may be provided. A targetable container enables a command to be shipped into a local or remote container, where the command will be executed.

Step 3.7

If the request requires the use of a controller command 308a, web controller 306a instantiates a controller command 308a. The controller command 308a may access database 106, using one or more entity beans 318.

Entity beans 318 are persistent, transactional commerce objects provided by software operating on server 100. Data can be accessed from an entity been which more closely models concepts and objects in the commerce domain, see step 3.7.5. Beans 318 may extend or replace existing entity beans 318. In addition, new application specific business requirements, can deploy entirely new entity beans. Entity beans 318 are implemented according to the Enterprise JavaBeans (EJB) component model known in the art.

Step 3.8

During execution, the controller command invokes one or more task commands 308c.

Referring to FIG. 3, task command 308c implements specific application logic. In general, a controller command and a set of task commands together implement the application logic for a URL request. A task command is not targetable, meaning it is always executed in the same container as the controller command 308a. A targetable command invocation incurs some overhead, so that making the task command 308c not targetable can improve the performance of the overall command frameworks.

Step 3.9

Figure 8:
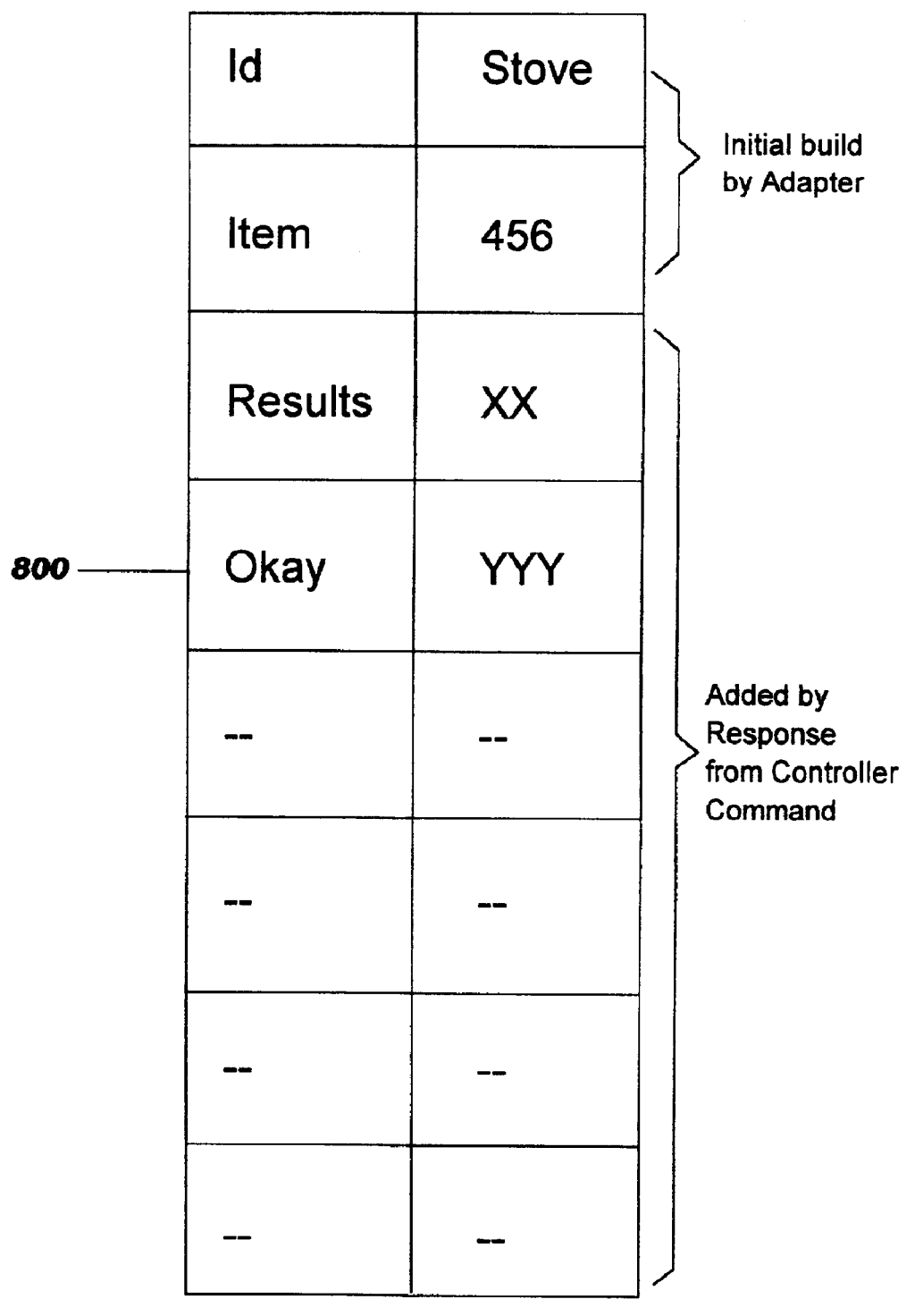

Upon completion, the controller command returns the results of the command and the name of a view associated with the request. Referring to FIG. 8, in the embodiment, the response properties object comprises a hash table 800 containing the view information, the ID information, the item and the results which are added to the response properties object. Data in the hash table 800 is formatted to correspond to the correct device type and controller. FIG. 4C(v) provides pseudo-code for the structure of hash table 800.

Step 3.10

Next, to output the results, web controller 306a instantiates and executes the view command.

The parameters of view command are provided from Table C in command registry 309. Table C is a database comprising a table having columns of specific views associated with various devices 104, 108 and 110.

Using Table C a view command for a specific output device may be associated for each store using server 100. When a view command name is returned from controller command 308a or is specified in an exception, web controller 306a examines the view command class from Table C. Multiple view command names may be mapped to the same implementation class. A view or JSP may be invoked by a client 104 without a corresponding controller command 306. For example, a user can register a logon.jsp with the URL name as the view name without providing a corresponding controller command.

TABLE C

VIEWREG

| Name | Description |
| --- | --- |
| VIEWNAME | View name |
| STORE_ID | Store ID for this command |
| DEVICETYPE | Output device type |
| INTERFACENAME | View command interface name |
| DESCRIPTION | Description of this command |
| HTTPS | Secure HTTP required to invoke this view, used for direct JSP invocation only. |
| CLASSNAME | View command implementation class name |
| PROPERTIES | Default name value pares as input properties to the view command |
| LASTUPDATE | Last update on this entry |

Figure 5:
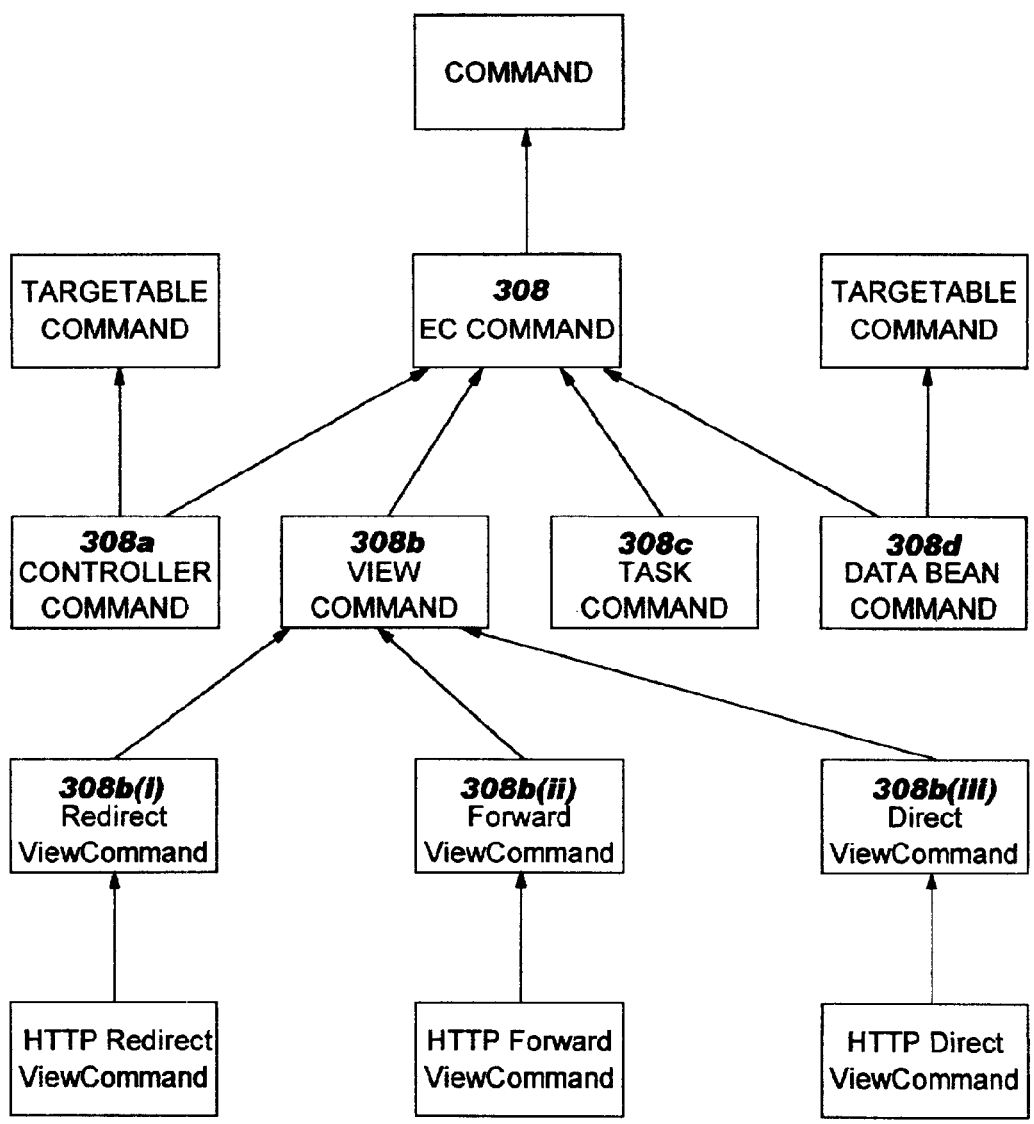
FIG. 5 is block diagram of relationships of commands for the software operating on the server of FIG. 1.

Referring to FIG. 5, there are three types of view commands:

i) Redirect view command 308b(i)

A redirect view command sends the view using a redirect protocol, such as the URL redirect, which causes the request defined in the redirect URL to be executed. When a redirect protocol is used, it changes the URL stacks in the browser. When a reload instruction is entered, the redirected URL will be executed instead of the original URL.

i) Direct view command 308b(ii)

A Direct view command sends the response view directly to the client.

i) Forward view command 308b(iii)

A forward view command forward the view request to another Web component, such as a JSP page 312.

Using the view name and the input device type, web controller 306a fetches a response JSP 312. With this scheme, a device specific view for each device may be implemented. On completion, web controller 306a sends an appropriate HTTP response back to device 104 based on data returned from controller command 308a. Web controller 306a has a framework allowing modification to its structure with minimum effort. For example, to add a new or change web controller 306a, an extension can be made to it.

Before invoking JSP 312, web controller 306a copies attributes from tho command to JSP 312. The attributes become the input parameters of data beans 314 in the responding JSP 312. Data bean 314 provides the dynamic content for JSP 312. The input properties are often required by a data bean 314, so that they can be used to form a primary key to fetch a complete data object from database 106 via an EJB.

A sample VIEWREG table (i.e. a specific implementation of Table C) which may be used in the embodiment with key information is shown in Table D below:

TABLE D

| COMMANDNAME | DEVICETYPE | INTERFACENAME | CLASSNAME | PROPERTIES |
| --- | --- | --- | --- | --- |
| ProductDisplayView | BROWSER | ForwardViewCommand | HttpForwardViewCommandImpl | |
| InterstItemAddView | BROWSER | RedirectViewCommand | HttpRedirectViewCommandImpl | DocName=item.jsp |
| InterItemDeleView | BROWSER | RedirectViewCommand | HttpRedirectViewCommandImpl | DocName=item.jsp |
| GenericApplicationError | BROWSER | RedirectViewCommand | HttpRedirectViewCommandImpl | DocName=usererr.jsp |
| GenericSystemError | BROWSER | RedirectViewCommand | HttpRedirectViewCommandImpl | DocName=syserr.jsp |
| Logon | BROWSER | ForwardViewCommand | HttpRedirectViewCommandImpl | DocName=logon.jsp |

Referring to FIG. 9, database table 900 corresponding to VIEWREG is shown during typical operation of server 100. Row 902 corresponds to the Name column of Table C. To add a new view for a new device, a new entry 904 is added to Table 900. Column 906 identifies the device type associated with a particular view. As such new PVC (pervasive computing) device in entry 904 will have its display formatted for PVC (per the entry in column 906) and will use the document "a2.jsp". This is because although the document name for a device can be the same, the PVC forward view cmd/Impl can add a subdirectory to the attribute to make different displays. Accordingly, for browser 104 document a.jsp is retrieved from the document directory, but for PVC devices, document pvc/a.jsp is retrieved from directory/pvc. As such, depending on the command, there will be difference in appearance based on the device model. It will be appreciated that this structure allows new display formats to be initiated for devices communicating with server 100.

Step 3.11

The view command forwards the request to a display template.

Steps 3.12 and 3.13

Within display template, a data bean is used to retrieve dynamic information form the database. Data bean manager 316 activates the data bean.

Data beans 314 represent containers of properties (or data) that are primarily used by page designers. Most commonly, they provide a simple representation of an entity, such as a retailer, associated with server 100. A page designer can place beans 314 on a JSP template, allowing dynamic information to be populated on the page at display time. Accordingly, the page designer only needs to know what data bean 314 can provide and what data the bean 314 requires as input; there is no need for the page designer to understand how the bean works.

A databean command 308d is invoked by JSP page 312 when a databean is to be instantiated. The primary function of a databean command 318 is to populate the data into a databean 314.

Other Command Aspects and Interfaces

The command and view are executed in one transaction. Accordingly, all shared objects between the command and view may be retrieved from database 106 with a single database transaction. It will be appreciated that reducing the number of transactions to database 106 is critical because such query processing is typically the most expensive operation in an e-commerce system.

As introduced earlier, server 100 also processes MQ messages. MQ adapter 304b listens for incoming messages from network 102. In the embodiment, the MQ message is formatted in an XML format. The XML format adapter converts the request information from an XML format the Request Object (see code 404, FIG. 4C(iii)) and passes it to the XML webcontroller 306b. FIG. 6A provides pseudo-code for the operation of MQ adapter 304b; FIG. 6B provides pseudo-code for the operation of XML controller 306b.

As described above, server 100 provides timed scheduling of tasks through scheduler 306c. In FIG. 7A, scheduler 306c runs background jobs. Jobs may be executed either only once at specified times or multiple times at determined intervals. A scheduler thread is allocated to execute a scheduler job. FIG. 7B provides pseudo-code on SchedulerThread and SchedulerAdapter 307c. SchedulerAdapter 307c receives a job to be executed, converts information relating to the job to a RequestObject (i.e. the common object used by controller 306) and passes the RequestObject to web-scheduler 306c. Referring to FIG. 7B, web scheduler 306c processes implementations which are specific to it, originating from scheduler 304c. FIG. 7C provides pseudo-code for scheduler web controller 306C.

The preferred embodiment of the software on server 100 utilizes an object oriented programming structure, such as a structure provided by Java. However, it will be appreciated that other programming languages and structures may be used which provide the features of the described embodiment.

Having thus described a particular embodiment, various alterations, modifications, and improvements will readily occur to those skilled in the art. Such alterations, modifications, and improvements are intended to be part of this disclosure, and are intended to be within the scope of the invention. Accordingly, the foregoing description is by way of example only and is not intended as limiting. It is noted that those skilled in the art will appreciate that various modifications of detail may be made to the preferred embodiments described herein which would come within the scope of the invention as described in the following claims.

The embodiments of the invention in which an exclusive property or privilege is claimed are defined as follows:

1. A method of interfacing a computer system executing commercial transactions initiated from a plurality of communication devices, each of said plurality of communication devices having a display, said display having custom display parameters, said method comprising:

at said computer system, for one device of said plurality of communication devices
receiving a command from said one device;
translating said command into a common format command, said common format command being executable by said computer system;
executing said common format command;
receiving results from execution of said common format command;
accessing a database comprising elements identifying a plurality of sets of display parameters, one set of display parameters of said plurality of sets of display parameters for use with said custom display parameters; and
retrieving from said database said one set of display parameters.

2. A method of interfacing a computer system executing commercial transactions initiated from a plurality of communication devices as claimed in claim 1, said method further comprising extracting command parameters from said command into an object after said receiving said command and initiating displaying of said results using said one set of display parameters on said one device after retrieving from said database said one set of display parameters.

3. A method of interfacing a computer system executing commercial transactions initiated from a plurality of communication devices as claimed in claim 2, wherein said translating said command into said common format command accesses a first table having a first record, said first record having a first entry for said command and a second table having a second record correlated to said first record for said common format command.

4. A method of interfacing a computer system executing commercial transactions initiated from a plurality of communication devices as claimed in claim 2, wherein after said receiving said results from execution of said common format command, said results are incorporated into said object.

5. A method of interfacing a computer system executing commercial transactions initiated from a plurality of communication devices as claimed in claim 4, wherein after retrieving from said database said one set of display parameters said one set of display parameters are incorporated into said object.

6. A method of interfacing a computer system executing commercial transactions initiated from a plurality of communication devices as claimed in claim 5, wherein after retrieving from said database said one set of display parameters, a view command identifying a composition of a view associated with said command is incorporated into said object.

7. A method of interfacing a computer system executing commercial transactions initiated from a plurality of communication devices as claimed in claim 6, wherein said view command is selected from one of a forward view, a redirected view or a direct view.

8. A method of interfacing a computer system to a plurality of communication devices as claimed in claim 7 wherein said method further produces an output report relating to said results.

9. A method of interfacing a computer system to a plurality of communication devices as claimed in claim 8 wherein said method is embodied in an object oriented programming language.

10. A system comprising:
a first computer having a program stored therein on a tangible computer-readable medium,
a network connection connected to said computer and carrying said program being encoded in said tangible computer-readable medium,
said program for use in a computer system having memory upon which said encoded program is embedded, said computer system executing commercial transactions initiated from a plurality of communication devices, each of said plurality of communication devices having a display, said display having custom display parameters, said program embodying a method comprising: for one device of said plurality of communication devices receiving a command from said one device; translating said command into a common format command, said common format command being executable by said computer system; executing said common format command; receiving results from execution of said common format command; accessing a database comprising elements identifying a plurality of sets of display parameters, one set of display parameters of said plurality of sets of display parameters for use with said custom display parameters; and retrieving from said database said one set of display parameters.

11. An article as claimed in claim 10, wherein said method of said program further comprises extracting command parameters from said command into a object after said receiving said command and initiating displaying of said results using said one set of display parameters on said one communication device after retrieving from said database said one set of display parameters.

12. An article as claimed in claim 11, wherein said method of said program further comprises accessing a first table having a first record, said first record having a first entry for said command and a second table having a second record correlated to said first record for said common format command.

13. An article as claimed in claim 12, wherein said method of said program further comprises incorporating said results into said object after said receiving said results from execution of said common format command.

14. An article as claimed in claim 13, wherein said method of said program further comprises incorporating said one set of display parameters into said object after retrieving from said database said one set of display parameters.

15. An article as claimed in claim 14, wherein said method of said program further comprises incorporating a view command identifying a composition of a view associated with said command into said object after retrieving from said database said one set of display parameters.

16. An article as claimed in claim 15, wherein said method of said program further comprises producing an output report relating said results on said one device.

17. A system for executing commercial transactions initiated from a plurality of communication devices, each of said plurality of communication devices having a display, said display having custom display parameters, said system comprising:
a computer;
a communication link for said computer to said plurality of communication devices;
a program operating on said computer, said program embodying a method comprising:
for one device of said plurality of communication devices;
receiving a command from said one device;
translating said command into a common format command, said common format command being executable by said computer system;
executing said common format command;
receiving results from execution of said common format command;
accessing a database comprising elements identifying a plurality of sets of display parameters, one set of display parameters of said plurality of sets of display parameters for use with said custom display parameters; and
retrieving from said database said one set of display parameters.

18. A system for executing commercial transactions as claimed in claim 17, wherein said method of said program further comprises extracting command parameters from said command into a object after said receiving said command and initiating displaying of said results using said one set of display parameters on said one communication device after retrieving from said database said one set of display parameters.

19. A system for executing commercial transactions as claimed in claim 18, wherein said method of said program further comprises accessing a first table having a first record, said first record having a first entry for said command and a second table having a second record correlated to said first record for said common format command.

20. A system for executing commercial transactions as claimed in claim 19, wherein said method of said program further comprises incorporating said results into said object after said receiving said results from execution of said common format command.

21. A system for executing commercial transactions as claimed in claim 20, wherein said method of said program further comprises incorporating said one set of display parameters into said object after retrieving from said database said one set of display parameters.

22. A system for executing commercial transactions as claimed in claim 21, wherein said method of said program further comprises incorporating a view command identifying a composition of a view associated with said command into said object after retrieving from said database said one set of display parameters.

23. A system for executing commercial transactions as claimed in claim 22, wherein said method of said program further comprises producing an output report relating said results on said one device.

24. A system comprising:
a first computer having a program stored therein;
a computer readable modulated carrier signal,
a network connection connected to said computer and carrying said program being encoded in said computer readable modulated carrier signal, said program for use in a computer system having memory upon which said encoded program is embedded, said computer system executing commercial transactions initiated from a plurality of communication devices, each of said plurality of communication devices having a display, said display having custom display parameters, said program embodying a method comprising: for one device of said plurality of communication devices receiving a command from said one device; translating said command into a common format command, said common format command being executable by said computer system; executing said common format command; receiving results from execution of said common format command; accessing a database comprising elements identifying a plurality of sets of display parameters, one set of display parameters of said plurality of sets of display parameters for use with said custom display parameters; and retrieving from said database said one set of display parameters.

25. A system as claimed in claim 24, wherein said method of said program further comprises extracting command parameters from said command into a object after said receiving said command and initiating displaying of said results using said one set of display parameters on said one communication device after retrieving from said database said one set of display parameters.

26. A system as claimed in claim 25, wherein said method of said program further comprises accessing a first table having a first record, said first record having a first entry for said command and a second table having a second record correlated to said first record for said common format command.

27. A system as claimed in claim 26, wherein said method of said program further comprises incorporating said results into said object after said receiving said results from execution of said common format command.

28. A system as claimed in claim 27, wherein said method of said program further comprises incorporating said one set of display parameters into said object after retrieving from said database said one set of display parameters.

29. A system as claimed in claim 28, wherein said method of said program further comprises incorporating a view command identifying a composition of a view associated with said command into said object after retrieving from said database said one set of display parameters.

30. A system as claimed in claim 29, wherein said method of said program further comprises producing an output report relating said results on said one device.

31. A system comprising:
a computer system having memory for storage therein;
a network connection connected to said computer system and carrying a program to be encoded for use in said computer system memory upon which said encoded program is embedded, said computer system executing commercial transactions initiated from a plurality of communication devices, each of said plurality of communication devices having a display, said display having custom display parameters, said program embodying a method comprising:
for one device of said plurality of communication devices
receiving a command from said one device;
translating said command into a common format command, said common format command being executable by said computer system;
executing said common format command;
receiving results from execution of said common format command;
accessing a database comprising elements identifying a plurality of sets of display parameters, one set of display parameters of said plurality of sets of display parameters for use with said custom display parameters; and
retrieving from said database said one set of display parameters.

\* \* \* \* \*